Jan. 3, 1967   C. J. McDOWALL ETAL   3,295,801

SHAFT HANGER

Filed May 4, 1965

INVENTORS
*Charles J. McDowall &*
BY *Victor W. Peterson*

*Paul Fitzpatrick*
ATTORNEY

United States Patent Office 3,295,801
Patented Jan. 3, 1967

3,295,801
SHAFT HANGER
Charles J. McDowall and Victor W. Peterson, Indianapolis, Ind., assignors to General Motors Corporation, Detroit, Mich., a corporation of Delaware
Filed May 4, 1965, Ser. No. 452,993
6 Claims. (Cl. 248—18)

Our invention relates to a shaft hanger, by which we mean a bearing support for rotatably supporting the mid portion or portions of a long rotating shaft to improve its whip characteristics.

The shaft hangers now available are generally not suitable for aircraft applications where weight is a prime concern. Accordingly, our object is to provide a lightweight shaft hanger which can be easily incorporated into a lightweight system for supporting long rotating shafts to improve the whip characteristics of the shaft and to damp vibrations therefrom. While our shaft hanger is particularly advantageous in aircraft applications where weight is of prime concern, it is capable of other uses where the weight consideration may be important.

With this and other objects in view, as will hereinafter more fully appear, and which will be more particularly pointed out in the appended claims, reference is now made to the following description taken in connection with the accompanying drawings in which:

Figures 1, 2:
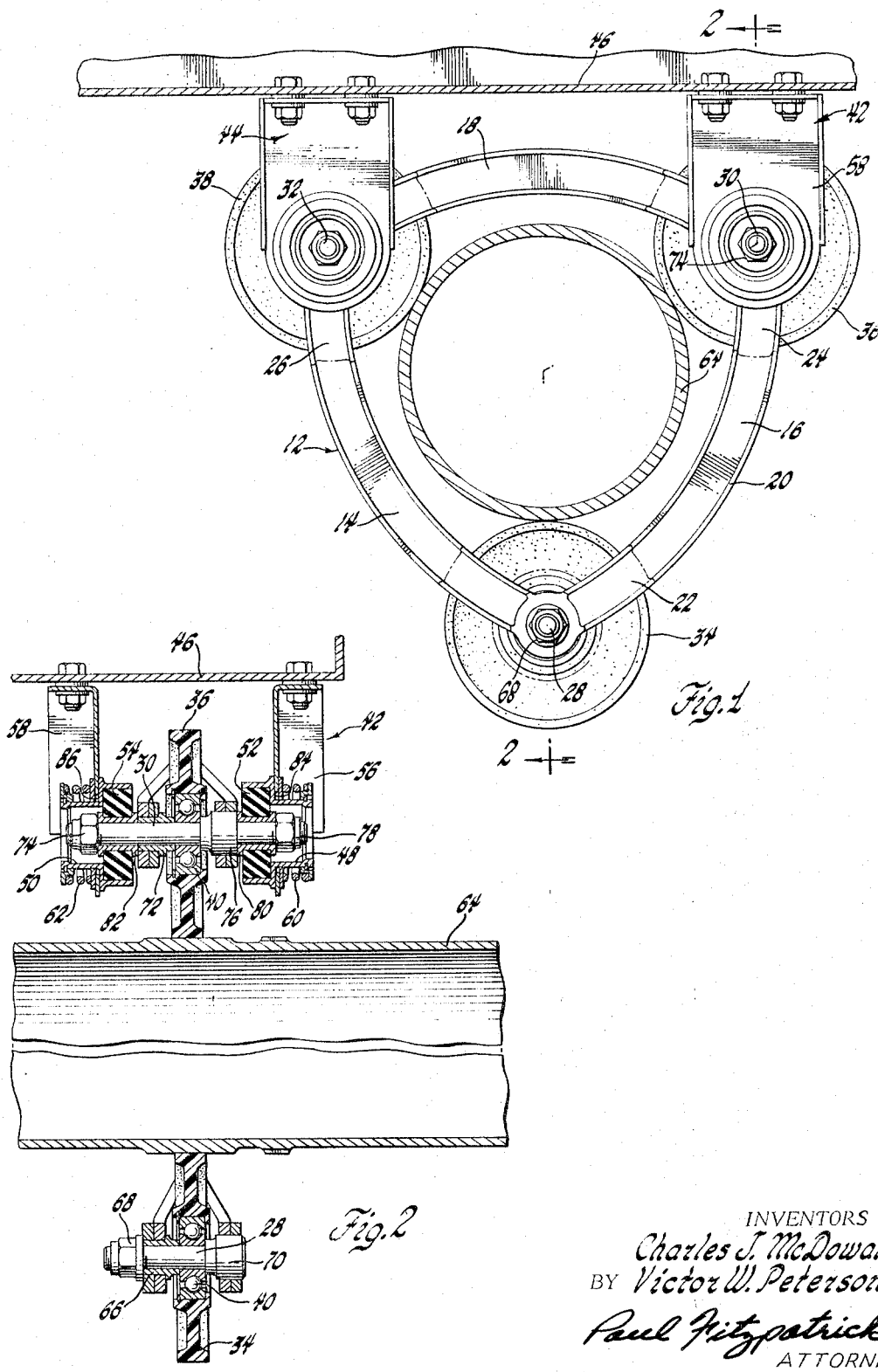
FIGURE 1 is a frontal view of a shaft hanger in accordance with our present invention.
FIGURE 2 is a section view taken substantially along the line 2—2 and looking in the direction of the arrows.

Referring now to FIGURE 1, the shaft hanger indicated generally at 12 comprises three arcuate frame members 14, 16, and 18. The frame members have bifurcated ends with aligned holes and when the frame members 14, 16, and 18 have their bifurcated ends mated with the bifurcated ends of the other frame members, a generally triangular frame 20 is formed. The apex portions 22, 24, and 26 of the triangular frame then are bifurcated and have aligned holes at their centers because of the bifurcated end portions of the frame members 14, 16, and 18. Stub shafts 28, 30, and 32 extend through the holes in the apex portions 22, 24, and 26, respectively. The stub shafts join the frame segments 14, 16, and 18 and also rotatably mount three plastic wheels 34, 36, and 38 which are disposed in the bifurcated apex portions. The plastic is of a type which is generally lightweight and provides a substantially hard wearing surface. Ball bearings 40 are disposed between the shafts 28, 30, and 32 and the wheels 34, 36, and 38. A flanged sleeve 66 on shaft 28 cooperates with a nut 68 threaded to the end of the shaft 28 to axially fix the shaft 28 with respect to frame 20. Wheel 34 and bearing 40 are centered between the inner end of sleeve 66 and the head 70 of the shaft 28.

The shafts 30 and 32 are mounted in brackets 42 and 44, respectively. The brackets, in turn, are shown secured to a support member 46. While both of the brackets 42 and 44 are shown as being secured to the same support member, it is to be understood that they may also be secured to different support members. It is equally to be understood that while shafts 30 and 32 are shown as supported, any two of the three shafts 28, 30, 32 could be supported. Since both of the brackets 42 and 44 are identical, the description of bracket 42 taken in connection with FIGURE 2 will be sufficient.

The bracket 42 comprises a pair of cylindrical housings 48 and 50. The ends of the housings 48 and 50 nearest the triangular frame 20 are cupped and have annular rubber blocks 52 and 54, respectively, disposed therein. The ends of the shaft 30 are mounted in metallic sleeves 80 and 82 fitted in the apertures of the annular rubber blocks 52 and 54, respectively. A second flanged sleeve 72 and a nut threaded to the left end of shaft 30 straddle the metallic sleeve of block 54 to axially fix the shaft with respect to frame 20 and also to mount the rubber block 54 and housing 50. An enlarged intermediate portion 76 and a second nut 78 threaded to the right end of shaft 30 mounts the rubber block 52 and housing 48 in the same manner. Wheel 36 is centered by the inner ends of sleeve 72 and the intermediate portion 76.

The outer ends of the housings 48 and 50 extend through aligned apertures 84 and 86 in the lower ends of a pair of spaced bracket arms 56 and 58, respectively. The apertures 84 and 86 are larger than the portion of the housing extending therethrough. This allows limited radial movement of the housings 48 and 50 with respect to the bracket arms 56 and 58. The bracket arms 56 and 58 are parts of the bracket 42 and are bolted to and depend from the support member 46. Coil springs 60 and 62 embrace the outer ends of the housings 48 and 50, respectively. The coil springs are biased between radial flanges on the outer ends of the housings and the bracket arms 56 and 58. Thus, each of the sleeves 48 and 50 is urged outwardly away from the triangular frame 20 with the radial walls formed by the cupped portions biased into frictional engagement with the bracket arms 56 and 58 adjacent their respective apertures.

A long tubular shaft 64 which is to be rotatably supported is disposed within the triangular frame 20 so as to be in frictional engagement with each of the rotatably mounted plastic wheels 34, 36, and 38. As the shaft 64 rotates, the plastic wheels are rotated and provide a bearing support for the shaft in the plane of the shaft hanger 12 thereby limiting the whip characteristics associated with a long rotating shaft. The shaft hanger 12 is capable of limited movement to absorb the vibrations transmitted to it by the rotating shaft 64. The first means providing vibration damping are the rubber blocks 52 and 54 which effectively mount the ends of stub shaft 30 for limited universal movement. The second means providing vibration damping is the frictional dissipation of vibration energy which occurs when the radial faces of the housings 48 and 50 rub against the bracket arms 56 and 58, respectively, as they move radially within the apertures 84 and 86, respectively. In addition, the combination of the resiliency of the rubber blocks 52 and 54 and the spring forces of the coil springs 60 and 62 which produce the frictional damping can be selected to completely damp the vibrations transmitted from the rotating shaft 64 to the frame 20.

Another feature of our invention can be appreciated should the need to replace the shaft 64 ever arise. In such a case, it becomes necessary only to remove bolts 68 and withdraw the shaft 28 from the right. The segments 14 and 16 can now be spread far enough apart to permit egress of the shaft 64.

Thus, it can be seen that we have provided a unique and useful lightweight shaft hanger which can easily be incorporated into a system for rotatably supporting a long rotating shaft and which includes means to resiliently and frictionally damp the vibration transmitted by the shaft to the hanger.

Various modifications are contemplated and may obviously be resorted to by those skilled in the art without departing from the spirit and scope of the invention, as hereinafter defined by the appended claims, as only a preferred embodiment thereof has been disclosed.

We claim:
1. A shaft hanger comprising:
a generally polygonal frame adapted to encircle a rotating shaft, wheels journaled to said frame at its apexes, said wheels being disposed so as to frictionally engage said shaft, and bracket means to support said frame, said bracket means including vibration damping means whereby said hanger is adapted to antifrictionally support said shaft and to damp vibrations therefrom.

2. A shaft hanger comprising:

a generally polygonal frame adapted to encircle a rotating shaft, said frame having bifurcated apex portions, stub shafts spanning said apex portions, wheels journaled on said stub shafts, said wheels being disposed so as to frictionally engage said rotating shaft, and bracket means to support at least two of said stub shafts, said bracket means including resilient and frictional vibration damping means whereby said hanger is adapted to antifrictionally support said shaft and to damp vibrations therefrom.

3. A shaft hanger comprising:

a frame adapted to encircle a rotating shaft, said frame having a plurality of bifurcated portions, stub shafts spanning and secured to said bifurcated portions substantially parallel to said rotating shaft, wheels disposed in said bifurcated portions and rotatably mounted on said stub shafts, said wheels being disposed so as to frictionally engage said rotating shaft, bracket means to support at least two of said stub shafts, each of said bracket means including a pair of cylindrical housings provided with annular resilient blocks, said blocks being mounted on the ends of said two stub shafts, a pair of spaced arms having aligned apertures, each of said housings extending through and radially movable in an aperture in one of said arms, and spring means biasing said housing into frictional engagement with said arm whereby said hanger is adapted to antifrictionally support said shaft and to damp vibrations therefrom.

4. A shaft hanger comprising:

a frame adapted to encircle a rotating shaft, said frame having a plurality of bifurcated portions, stub shafts spanning and secured to said bifurcated portions substantially parallel to said rotating shaft, wheels disposed in said bifurcated portions and rotatably mounted on said stub shafts, said wheels being disposed so as to frictionally engage said rotating shaft, bracket means to support at least two of said stub shafts, each of said bracket means including a pair of cylindrical housings having cupped portions provided with annular resilient blocks, said blocks being mounted on the ends of said two stub shafts, a pair of spaced arms having aligned apertures, each of said housings extending through and radially movable in an aperture in one of said arms with the cupped portion thereof frictionally engaging said arm adjacent said aperture, and a coil spring embracing said housing between said arm and the outer end of said housing biasing said cupped portion against said arm whereby said hanger is adapted to antifrictionally support said shaft and to damp vibrations therefrom.

5. A shaft hanger comprising:

a frame adapted to encircle a rotating shaft, said frame having three circumferentially spaced bifurcated portions, stub shafts spanning and secured to said bifurcated portions substantially parallel to said rotating shaft, wheels disposed in said bifurcated portions and rotatably mounted on said stub shafts, said wheels being disposed so as to contact said shaft at three equally circumferentially spaced points, bracket means to support at least two of said stub shafts, each of said bracket means including a pair of cylindrical housings having cupped portions provided with annular resilient blocks, said blocks being mounted on the ends of said two stub shafts, a pair of spaced arms having aligned apertures, each of said housings extending through and radially movable in an aperture in one of said arms with the cupped portion thereof frictionally engaging said arm adjacent said aperture, and a coil spring embracing said housing between said arm and the outer end of said housing biasing said cupped portion against said arm whereby said hanger is adapted to antifrictionally support said shaft and to damp vibrations therefrom.

6. A shaft hanger comprising:

a generally triangular frame adapted to encircle a rotating shaft, said frame having bifurcated apex portions, stub shafts extending through and secured to said apex portions substantially parallel to said rotating shaft, wheels disposed in said apex portions and rotatably mounted on said stub shafts, said wheels being disposed so as to contact said shaft at three equally circumferentially spaced points, bracket means to support at least two of said stub shafts, each of said bracket means including a pair of cylindrical housings having cupped portions provided with annular resilient blocks, said blocks being mounted on the ends of said two stub shafts, a pair of spaced arms having aligned apertures, each of said housings extending through and radially movable in an aperture in one of said arms with the cupped portion thereof frictionally engaging said arm adjacent said aperture, and a coil spring embracing said housing between said arm and the outer end of said housing biasing said cupped portion against said arm whereby said hanger is adapted to antifrictionally support said shaft and to damp vibrations therefrom.

References Cited by the Examiner

UNITED STATES PATENTS

| 935,593 | 9/1909 | Esco | 308—203 |
| 3,003,831 | 10/1961 | King et al. | 180—70 X |

FOREIGN PATENTS

| 85,284 | 4/1895 | Germany. | |

CLAUDE A. LE ROY, *Primary Examiner.*

R. P. SEITTER, *Assistant Examiner.*